US009338297B2

(12) United States Patent
Davis (10) Patent No.: US 9,338,297 B2
(45) Date of Patent: May 10, 2016

(54) SETUP APPLICATION FOR GENERATING CUSTOM CODE

(71) Applicant: Avaya, Inc., Basking Ridge, NJ (US)

(72) Inventor: Barrett Davis, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 26 days.

(21) Appl. No.: 14/159,301

(22) Filed: Jan. 20, 2014

(65) Prior Publication Data

US 2015/0207935 A1    Jul. 23, 2015

(51) Int. Cl.
*H04M 3/00* (2006.01)
*H04M 5/00* (2006.01)
*H04M 3/51* (2006.01)
*G06Q 10/00* (2012.01)

(52) U.S. Cl.
CPC ............. *H04M 3/5175* (2013.01); *G06Q 10/00* (2013.01)

(58) Field of Classification Search
CPC .............................. H04M 3/5175; H04M 3/51
USPC ................................... 379/265.03, 266.1, 242
See application file for complete search history.

(56) References Cited

U.S. PATENT DOCUMENTS 7,814,142 B2 * 10/2010 Mamou et al. ................ 709/203
2005/0262192 A1 * 11/2005 Mamou et al. ................ 709/203

OTHER PUBLICATIONS

"Google Web Toolkit", Wikipedia, Jul. 17, 2013, 8 pages, retrieved from http://en.wikipedia.org/wiki/Google_Web_Toolkit.
"Maven Liquibase Plugin", Liquibase.org, Aug. 2, 2013, 8 pages, retrieved from http://www.liquibase.org/documentation/maven/index.html.

* cited by examiner

*Primary Examiner* — Thjuan K Addy
(74) *Attorney, Agent, or Firm* — Sheridan Ross P.C.

(57) ABSTRACT

Contact centers often employ a number of in-memory processes as one means of providing fast and efficient data processing. In-memory processes produce messages for reports or as inputs to other processes. While every available message producing option may be turned on, the processing overhead may be burdensome on even the most powerful computing platforms. As a result, contact centers selectively activate the production of messages. Furthermore, errors and/or inefficiencies may exist when a message produced is either not used or not producing the message content expected. Similarly, messages may be expected but the production of such a message has not been enabled and/or has been disabled, possibly inadvertently. By being able to apply a semantic level change, which in turn is mapped to individual reporting elements of reporting objects, the reporting objects may be modified and/or optimized to produce the desired data without requiring a programming to manually implement such changes.

20 Claims, 5 Drawing Sheets

FIG. 5

SETUP APPLICATION FOR GENERATING CUSTOM CODE

FIELD OF THE DISCLOSURE

The present disclosure is generally directed toward contact centers and more particularly to the configuring of contact centers.

BACKGROUND

Contact center hardware generates events and a stateful process listens to the raw event information. The raw events are processed, together with additional customer-specific data, to create logical events The logical events are placed into a database and forwarded to additional processes that keep an in-memory image (near real-time data). Other elements get incorporated into that data, including snapshots, metrics, etc., known as a workflow.

Customers often require a high degree of report customization and that contact center workflow implementations get redesigned every few years. The new best practice is to transmit the data structures from one component to another (state machines, database, Java container, reports, etc.), often using many technologies. A process that invites errors, incompatibilities, and possibly performance issues.

SUMMARY

It is with respect to the above issues and other problems that the embodiments presented herein were contemplated.

One benefit of the disclosure herein is the processing of data semantics and form to become good and usable metrics for the contact center. Usability often requires serving multiple purposes and uses. It is terribly inefficient to manually create and maintain changes at all levels of the contact center implementations.

In certain embodiments disclosed herein, a set-up application is provided that operates at the semantic level and produces specific code needed at each level of a unique contact center processing and reporting system.

The data semantics and workflow are often described in Extensible Markup Language (XML). One implementation of certain embodiments disclosed herein, produces Java, SQL and configuration files needed at each level of the contact center implementation. Additionally, once a specific report is defined, the report may be used to optimize data processing such as by removing unneeded or redundant calculations. When the implementation details of a contact center change with a new product revision, a new version of this proposed application can read the semantic definitions for a customer site and generate the same work flow on top of the new contact center system.

Contact center cares about, among other things, costs, efficiencies, and measuring the two. To that end, contact center utilize a variety of systems, applications, configurations, statistics, and metrics. Contact centers typically implement a system having a first processing unit; which sends information to a database; a second processing unit, which sends information out to resources receiving and making contacts; and a third processing unit which connects to lightweight directory access protocol ("LDAP") repository and other resources, having information such as customer names and account information.

In-memory computing software platforms, such as Gigaspaces (www.gigaspaces.com), process developer's data and applications in real time. In-memory computing software platforms are used by developers since it provides ultra-fast data access and partitioned data for efficiency and scalability. In-memory computing software platforms also support transactions, rich query semantics, and data indexing, all of which are important to the efficient operation of a contact center.

Unfortunately, developers and installers must make a lot of "boiler-plate" code to transmit and process information within the in-memory platform, which can be error prone and inefficient. Many contact centers require customized data measures that are different from the standard shipping set of measures and, therefore, require customization which may further compound the errors and inefficiencies. Consumer and producer code may need to be developed for a specific contact center architecture and the processing units and/or applications. As a result, common code may require subclassing and/or annotation, thereby further increasing the likelihood of errors or subtly incompatible components, which may be difficult to detect.

Certain embodiments herein provide a set-up application for customization of input and processing components within the in-memory platform. In one embodiment, the set-up application builds the, often finicky and tedious, boiler-plate code and configuration files for the developers to use when building a contact center. The set-up application takes a description of data objects and processing objects, such as an XML file, and emits the code (e.g., Java) and configuration files used to create or change the contact center system. This allows for the tuning of the data and processing components for a particular installation. As a result, the setup application is able to customize the contact center and handle data beyond the standard implementation. Additionally, the set-up application is operable to accommodate site differences for regulatory and customer needs.

The set-up application is an adaptable tool that may be used at different times:
  at creation (setup)—configuration and installation
  at runtime (optimization)—especially for reports In certain embodiments, the set-up application sets up the system, creates the configuration, and installs it. The system reads the data definition, generates the XML code, the configuration files, and the SQL structure to implement for a particular customer. The instantiation of code includes the auto-generated configuration that the customer requested.

In additional embodiments, once a configuration has been built, the set-up application is operable to read old configuration information and the new tool does the same with the next architecture of reporting elements (without shutting down the contact center).

One advantages of the disclosure provided herein is allows a contact center supervisor to request that a new reports and/or metrics, such as for a number of managers. Rather than having to wait for custom code or a special report, the set-up application compiles the new reports and delivers them to the supervisor.

In one embodiment, a method is disclosed, comprising: accessing a first reporting object of a contact center, the reporting object comprising a first number of reporting elements; reading the first number of reporting elements from the first reporting object; receiving a semantic description of a modification; mapping the semantic description to a modification of the first number of reporting elements; and generating a set of configuration instructions comprising the modification.

In another embodiment, a system is disclosed, comprising: a memory; an input interface; and a processor; the processor being configured to: access, in the memory, a first reporting object of a contact center, the reporting object comprising a first number of reporting elements; read the first number of reporting elements from the first reporting object; receiving, via the input interface, a semantic description of a modification; mapping the semantic description to a modification of the first number of reporting elements; and generating a set of configuration instructions comprising the modification.

In yet another embodiment, a non-transitory medium is disclosed having instructions that when read by a computer cause the computer to perform: accessing a first reporting object of a contact center, the reporting object comprising a first number of reporting elements; reading the first number of reporting elements from the first reporting object; receiving a semantic description of a modification; mapping the semantic description to a modification of the first number of reporting elements; and generating a set of configuration instructions comprising the modification.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

The term "reporting object" as used herein refers to a computing component, or subcomponent, that produces messages. The messages produced are generally informational messages but may comprise instructions. Reporting objects may receive and/or modify the messages produced by other reporting objects. For example, one reporting object may create an event associated with an agent of a contact center, "Off-hook 1 Feb. 2014: 09:04:59." A second reporting object may receive the record and perform an operation (e.g., determine how long the off-hook state lasts, access a number for the customer, dial the number, etc.) or perform a reporting process, such as an aggregation of other data. For example, "Agent Joe Smith, call 0005, Off-Hook."

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedent.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
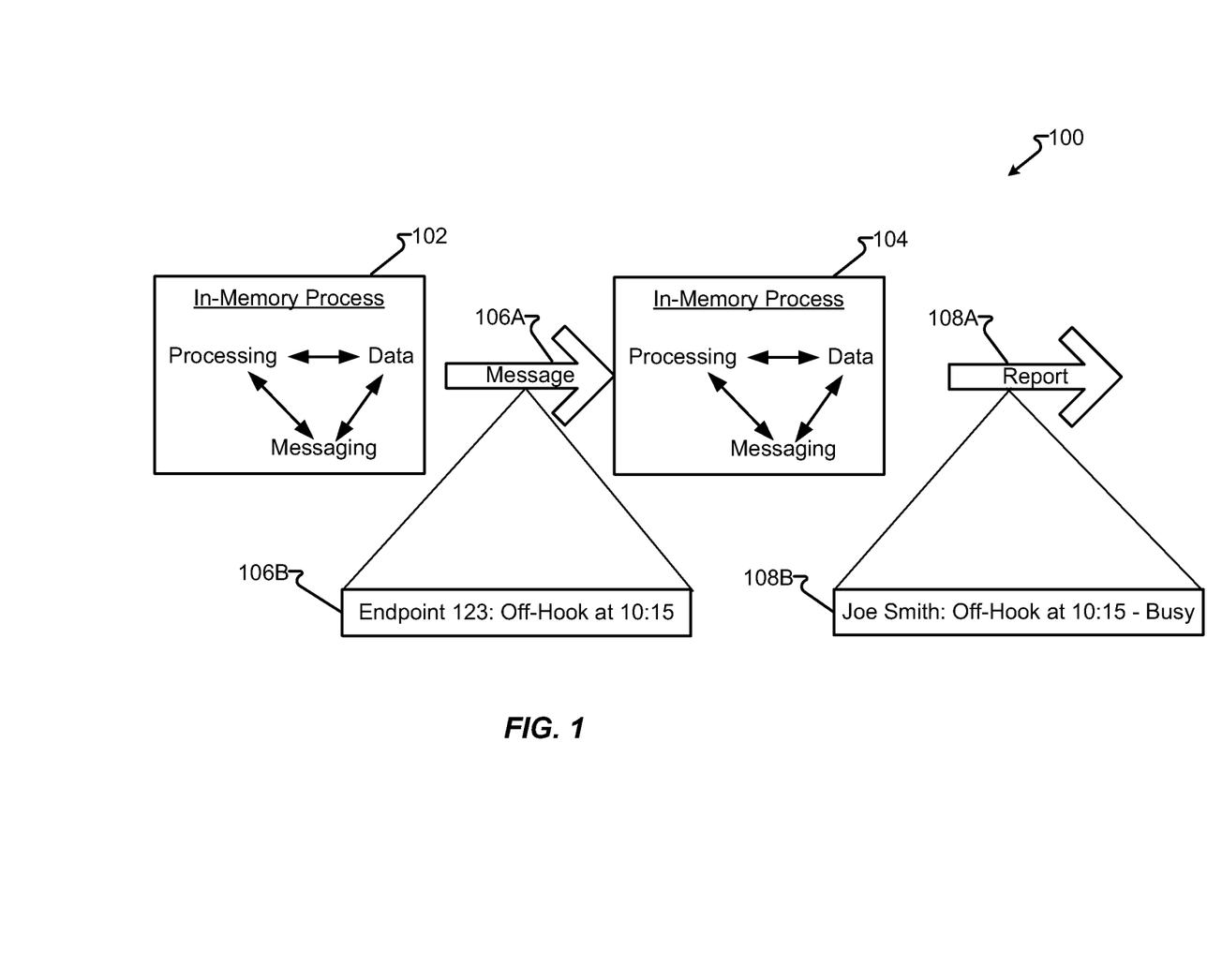
FIG. 1 depicts a contact center modification in accordance with embodiments of the present disclosure.

With reference now to FIG. 1, diagram 100 will be described in accordance with embodiments of the present disclosure. Contact centers are generally known in the art to make (outbound) and receive (inbound) contacts to and from customers. A contact, in some embodiments, may comprise one or more of a telephone call, text message, email, text chat, audio chat (e.g., voice over IP), video chat, social media post, and/or other means of communicating with a customer. Contact centers may include a number of in-memory applications for fast reporting of messages (e.g., events, states, failures, operations, etc.). Reporting objects or processes may correspond to a process executed by a reporting application and reporting objects or processes may be configured to generate messages, such as from a number of reporting elements, for use in reports and/or as inputs for other reporting objects. As a benefit of the embodiments disclosed herein, a contact center may be setup and/or maintained in a more-optimum state by customizing and altering the configuration of reporting objects or processes.

In one embodiment, in-memory processes 102, 104 are reporting objects. In-memory process 102 performs a process, and produces message 106. In-memory process 104 receives message 106, performs its own processing, and produces another message, such as report 108. Report 108 may then be made available to users and systems for various purposes. The report 108 may be distributed via email, fax, voice messaging, SMS, etc.

As an example, in-memory process 102 produces message 106B, such as by capturing a terminal number (e.g., "123"), an event, (e.g., "off-hook"), and a time (e.g., "10:15"). In-memory process 104 may create its own message data (e.g., a message indicating a call originating from endpoint 123 at 10:15 was terminated due to a busy signal) and may process at least a portion of received message 106 (e.g., determining endpoint 123 is agent Joe Smith).

In practice, a contact center is much more complex than that provided by diagram 100. The many agents placing and receiving calls, emails, texts, video chats, social media posts, and other actions employs a large number of in-memory processes and generates a vast number of records. The potential for wasted processing, unusable data, or other errors and inefficiencies escalates as the number of in-memory processes grows. Compounding the potential for errors and/or inefficiencies is the need to update, remove, and add processes and to provide data usable to multiple users.

In-memory processes 102, 104 may be considered reporting objects as they produce messages. Reporting objects may optionally receive messages with, or without, further processing of the received messages.

Figure 2:
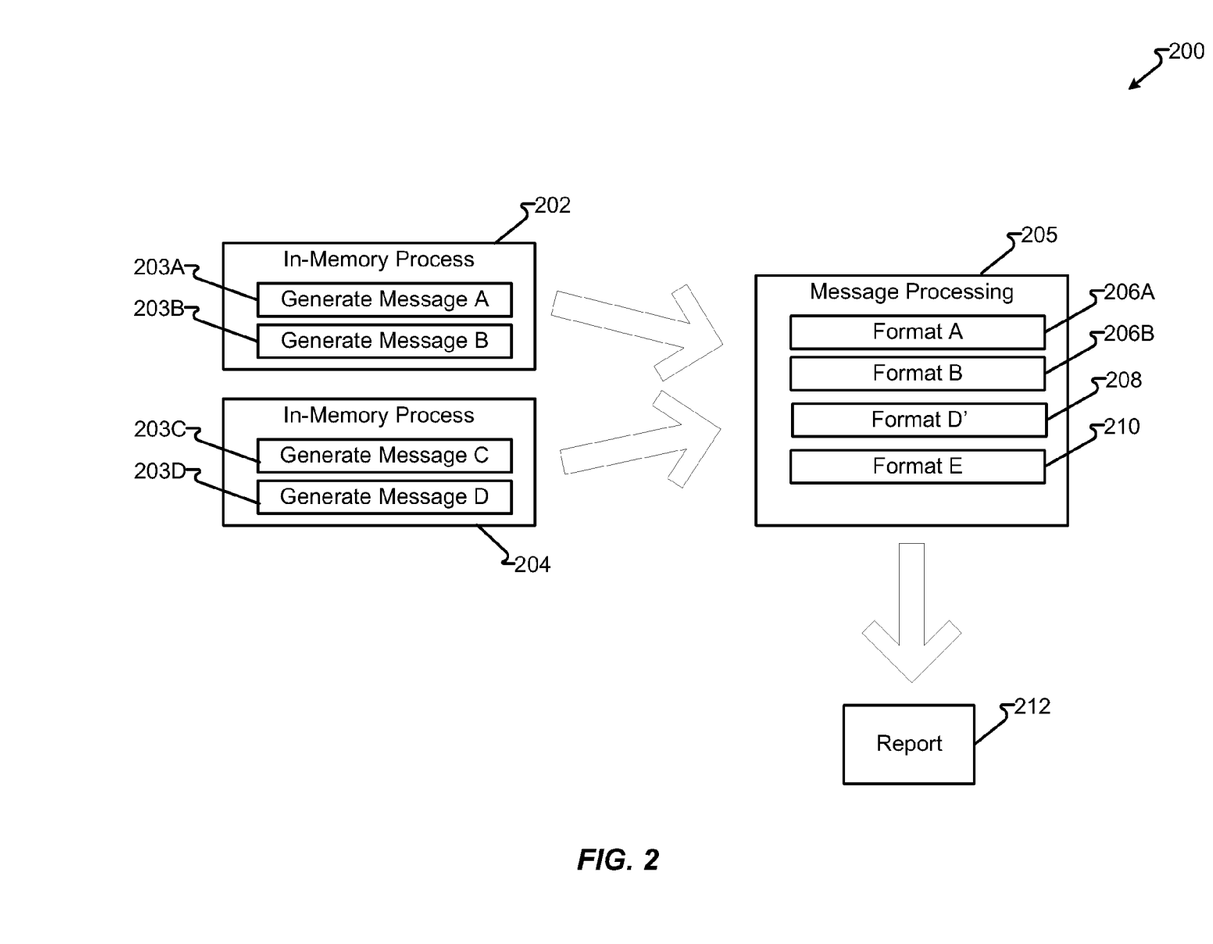
FIG. 2 depicts a modification of an in-memory process in accordance with embodiments of the present disclosure.

With reference now to FIG. 2, diagram 200 will be described in accordance with embodiments of the present disclosure. In one embodiment, messages produced by reporting elements 203 are generated by in-memory processes 202, 204 as inputs to report 212. In-memory processes 202, 204 perform processing operations within a contact center. In-memory process 202 generates messages from reporting elements 203A, 203B and in-memory process 204 generates messages from reporting elements 203C, 203D, respectively. Reporting element 203 are then made available to message processing 205.

Message processing 205 may be another in-memory process, an off-line process, or other processing means that uses reporting element messages 203 and/or produce reports comprising formatted versions of reporting element messages 203.

Message processing 205 receives messages from reporting elements 203. Messages produced by reporting elements 203 are consumed by report generators, message accumulators, and/or other reporting objects as they become available. For example, messages may be wrote to a file, database, messaging system, and/or direct communication between processes in a computer system. If a problem exists in either the production or consumption of messages, processing continues substantially unaffected. Message processing 205 formats messages received from reporting element A (203A) into formatted record A (206A) and reporting element B (203B) into formatted record B (206B). However, as may exist in a contact center, inefficiencies and/or errors may exist.

Message processing 205 is provided a message from reporting element D (203D) however, record receiving reporting element 208 is expecting to format a record of a different type, for example, "D'" (D-prime) and not "D" (D-not prime). The discrepancy may represent a difference in formatting (e.g., "MM/DD/YY-YYYY-MMM-DD", string length 10/string length 20, etc.), data types (e.g., integer/longinteger, float/integer, etc.), structure (e.g., custom structure A/custom structure B), or other non-agreements of otherwise correct data.

Message processing 205 is not performing any processing on message produced by reporting element C (203C). As a result, in-memory process 204 may be performing unnecessary processing by executing reporting element C (203C) to provide messages to message processing 205, which are then ignored. Even if message processing 205, in practical terms, "ignores" a message, processing may also be expended to determine what the message is, that it not current processed, and/or to create error records. Furthermore, message processing 205 has been established to format record E (210) however, no message E is produced.

In another embodiment, diagram 200, and more particularly in-memory process 204 represents an updated component to a contact center employing message processing 205. For example, in-memory process may be a new component, a replacement component (e.g., upgrade, newer version, etc.). Message processing 205 at the errors/inefficiencies, such as by ignoring message C (203C), formatting record D' (208), and having instructions expecting a message E to format record E (210), may have been an accurate with a prior or alternative version of an in-memory processes, which is now in-memory process 204.

In yet another embodiment, diagram 200, and more particularly message processing 205 represents the records (206A, 206B, 208, 210) selected to produce report 212, such as for one purpose, manager, etc. A prior report may have been optimized, such that message processing 205 received messages required and without superfluous messages to produce records for the prior report. Report 212 is variously embodied and the composition of which may be determined as a matter of design choice. For example, key performance indicators ("KPI") may be produced for a particular agent or group of agents, call abandonment, customer satisfaction, resolution rate, topic, customer or customer classification, or other metric as may be desired.

Figure 3:
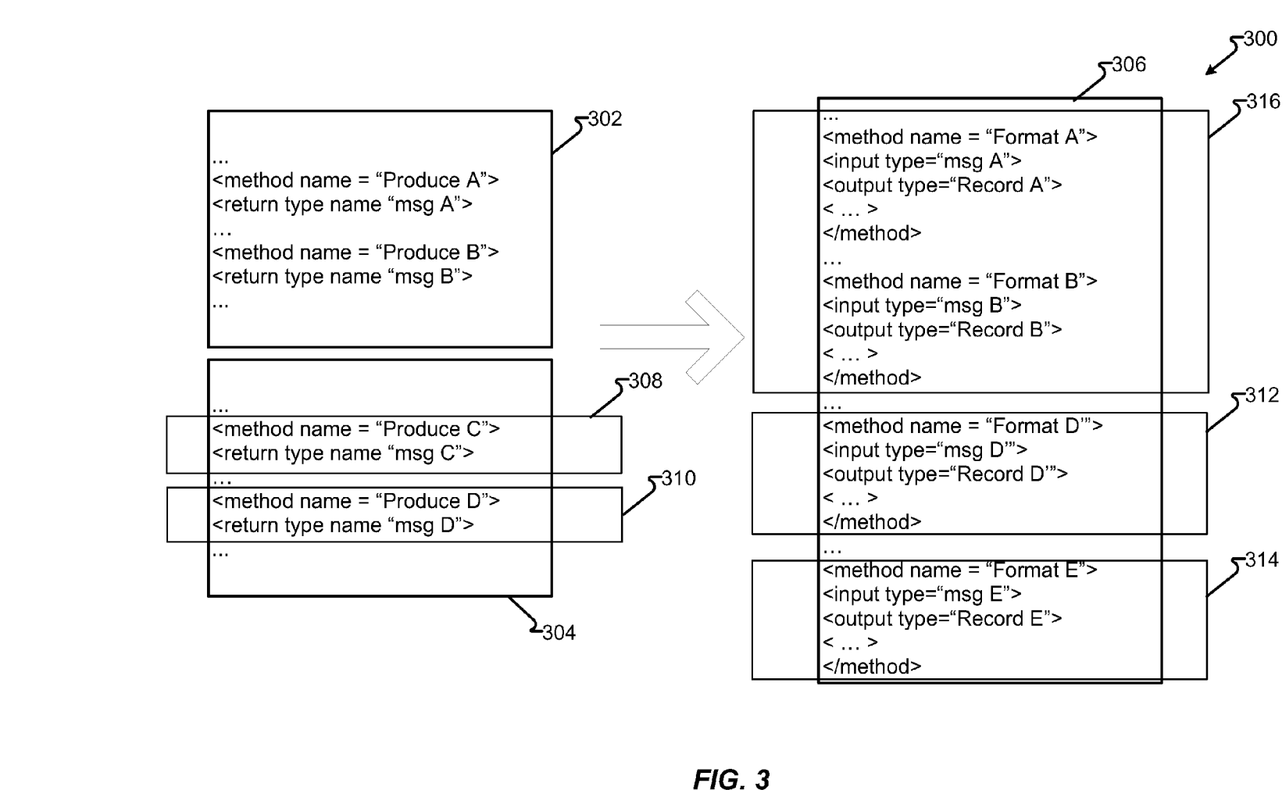
FIG. 3 depicts an in-memory process operation in accordance with embodiments of the present disclosure.

With reference now to FIG. 3, diagram 300 will be described in accordance with embodiments of the present disclosure. In one embodiment, programming blocks 302, 304, 306 illustrate pseudo-code for the creation and processing of messages. In a further embodiment, programming block 302 represents programming instructions for in-memory process 202, programming block 304 represents programming instructions for in-memory process 204, and programming block 306 represents programming instructions for in-memory process 206.

In one embodiment, at least one of programming block 302, 304, 306 is implemented in extensible markup language (XML) and/or structured query language (SQL). In other embodiments, other code and/or descriptor language is used such that the data produced by one programming block, such as to produce a message and the data expected by another programming block, such as to receive a message, may be read for analysis.

In another embodiment, differences are identified in code segments 306, 310, 312, 314. Optionally, code segments that are similar, such as programming block 302 and programming block 316, where the outputs are in accord with the expected inputs, may be identified such as to confirm compatibility or other purposes. In another embodiment, the input expected in programming block 312 (e.g., "D'") is identified dissimilar to the associated programming block 310 (e.g., "D"). In another embodiment, the message created by programming block 308 ("msg C") is identified as unused. In yet another embodiment, programming block 314 ("Record E") is determined to not have a corresponding input ("msg E").

In another embodiment, differences and/or similarities between message creating objects, such as programming blocks 302, 304 and message receiving objects, such as programming block 306, may be analyzed. In a further embodiment, the similarities and/or differences may be mapped and further associated with a semantic identifier.

Figure 4:
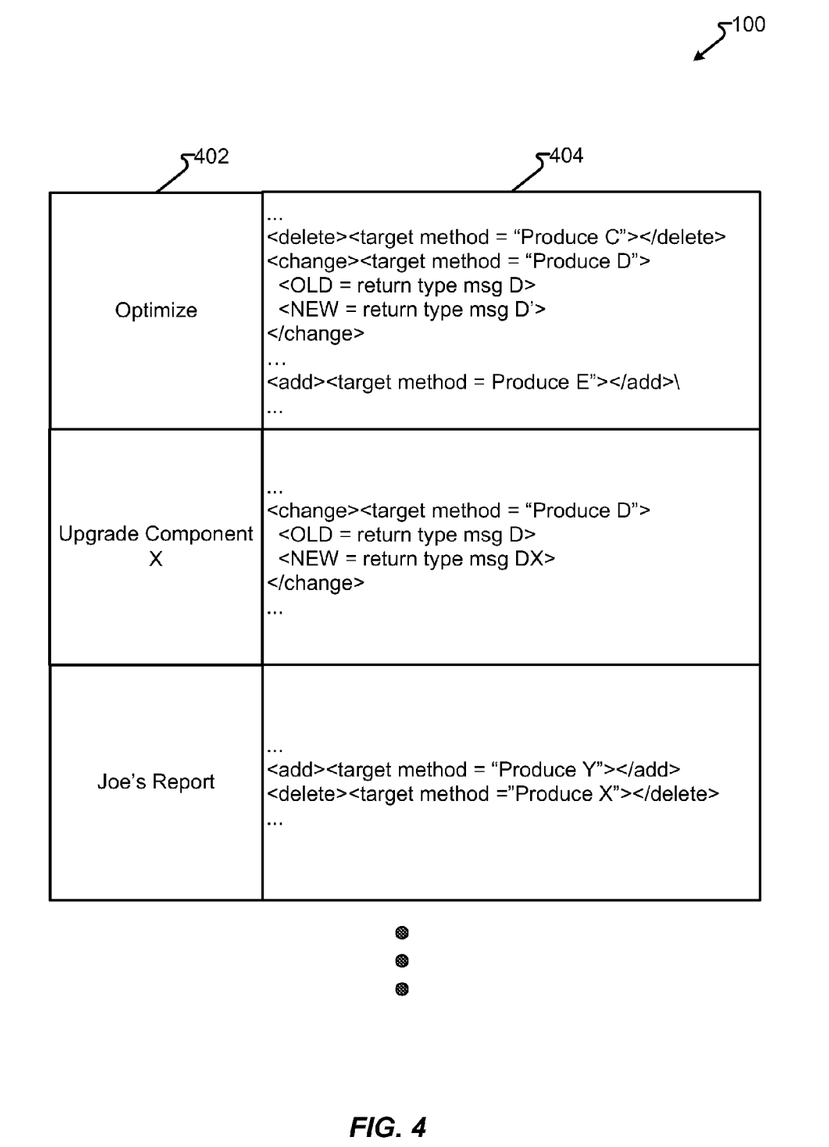
FIG. 4 depicts a system for modifying an in-memory process in accordance with embodiments of the present disclosure.

With reference now to FIG. 4, table 400 will be described in accordance with embodiments of the present disclosure. In one embodiment, a number of semantic identifiers 402 are mapped to corresponding instructions 404, illustrated herein as pseudo-code. Instructions 404 provide computer readable and/or executable instructions, or human readable instructions that may be processed (e.g., compiled) into computer executable instructions. When executed, instructions 404 may then perform an operation to, for example, optimize a contact center, produce a desired report, upgrade a component, or other operation.

In a further embodiment, table 400 may be stored and/or ported to other systems. Other systems may include the same contact center at a different date or time or with a different configuration, such as an upgrade or additional component. Table 400 may be made available to other contact centers. As an advantage of certain embodiments provided herein, a change to a contact center may be facilitated by a set of instructions and those instructions executed on a different contact center without requiring a duplication of efforts. For example, the introduction of a new component, and associated message events from in-memory processing, may be accompanied by a semantic identifier (e.g., "Install component X") and the execution of associated instructions automatically changes the contact center's messaging components so as to accommodate the new component. The next contact center can similarly be provided and execute the semantic identifier. As a result, once debugged, the opportunity for errors and inefficiencies may be reduced.

Figure 5:
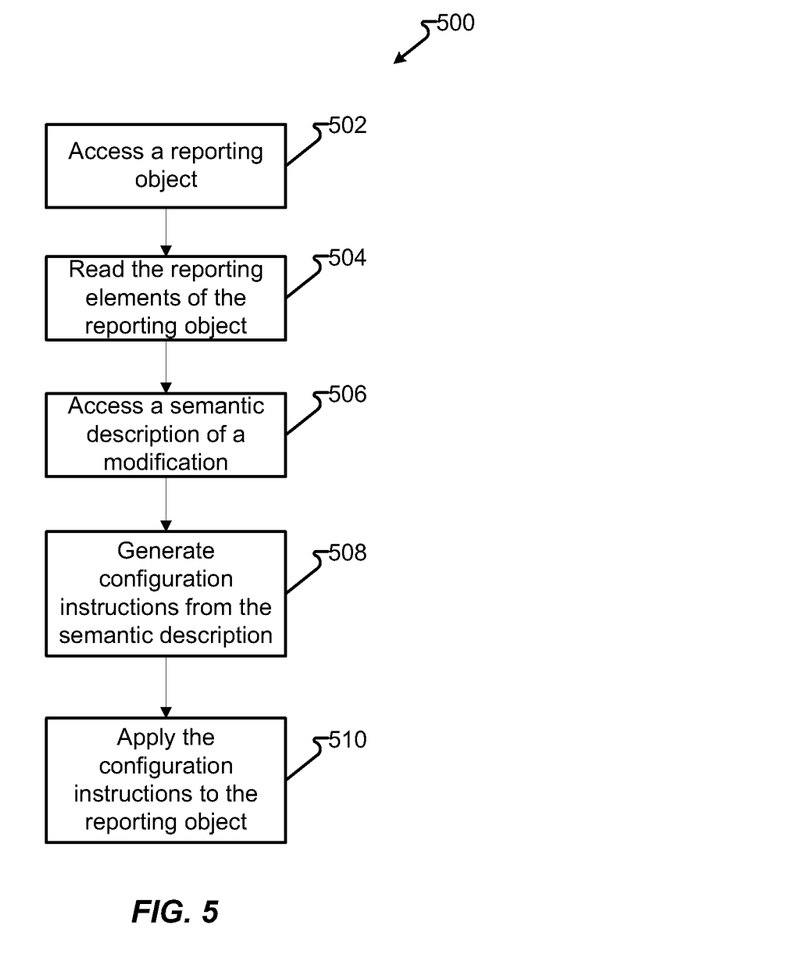
FIG. 5 depicts a process in accordance with embodiments of the present disclosure.

With reference now to FIG. 5, process 500 will be described in accordance with embodiments of the present disclosure. In one embodiment, step 502 accesses a reporting object. Step 504 reads the reporting elements of the reporting object accessed in step 502. Step 506 accesses a semantic description of a modification. Step 508 generates a set of configuration instructions from the semantic description. Step 510 applies the configuration instructions to the reporting object.

In another embodiment, step 502 accesses a reporting object by receiving a reporting object and/or receiving an identifier of a reporting object and then accessing the reporting object or a descriptor of the structure (e.g., methods, inputs, outputs, etc.) of the reporting object. Other means for accessing a reporting object may also be implemented. In another embodiment, step 504 reads the reporting elements of the accessed reporting object by accessing an index, table, name, database entry, or other identifier of an associated reporting object. The reporting elements may be in machine readable form, human readable form, or both (e.g., interpreted code). An appropriate de-compiler or identification means (e.g., index, table, or database) may be employed to access the reporting elements of reporting objects.

In another embodiment, step 506 accesses a semantic description of a modification by receiving the semantic description, such as by a user on a computer input device. Instructions, expert system, artificial intelligence, or other means may be employed to receive a semantic description and, at step 508, may then be associated with configuration instructions. As a further example, a user may provide the semantic description, "more call detail" whereby a system may have categories of "call detail" reporting elements/objects identified as more or less (e.g., 0-5). For instance, "call detail 0" may disable all call reporting elements/objects, "call detail 1" may be associated with only the most rudimentary call elements (e.g., begin, end, duration), "call detail 2" may provide more information, and so on through "call detail 5," which may provide verbose call detail reporting or even enable every call element/object associated with call records being enabled.

Continuing the example, a semantic description of, "more call detail" may then be provided to step 508 whereby configuration instructions may be generated and associated with, setting, "call detail level=call detail level+1." Step 508 may further generate instructions whereby reporting elements/objects associated with the next level of call reporting detail are enabled. It should be apparent to those of ordinary skill that selecting "more detail" may disable certain reporting elements/objects. For example, a low level of agent production reporting may include a summary element, such as the number of calls received. Such a rudimentary record may be unwanted, and therefore disabled, when a more detailed report, such as one that itemizes calls received, is selected.

In another embodiment, step 506 may include accessing an optimization semantic description. In one example, "optimize" is associated with an all encompassing determination of the reports made and the inputs to those reports, including reporting elements/objects and the data types, structures, or other records used as inputs and outputs. Step 508 may then generate instructions to detect discrepancies, such as between reporting objects. One reporting object may expect a message to include in one data structure, however, its associated message generating reporting object may produce a message with a different data structure. Additionally, unused messages and/or reports or other discrepancies may be identified. Step 508 may then generate the appropriate instructions to correct the discrepancies. In other embodiments, "optimize" may be more selective and/or limited as a matter of implementation choice.

In another embodiment, step 508 automatically generates corrective configuration instructions. For example, if it is determined that one reporting object produces a structure, (e.g., A=int, B=long, C=String) and another reporting object is reading the structure, but with fewer arguments (e.g., A=int, B=long) then the ignored portions of the structure (e.g., C=String) may be disabled. Certain discrepancies may require human intervention. For example, discrepancies in usage may be identified by comments and require human intervention, such as when one reporting object products a data structure with, "duration=INT" and another reporting object, or report, reads the message expecting, "seconds_connected=INT." The data type (e.g., INT) is the same, but the apparent usage differs (e.g., "duration" versus "seconds_connected") and may or may not have an associated automated reconciliation. For issues without an automated reconciliation, the discrepancy may be presented to a user for reconciliation. The user's reconciliation may be captured and future discrepancies of a like manner may then be associated with the same reconciliation generated, such as by being accessed, by step 508.

In a further embodiment, step 508 may generate configurations instructions once, with or without human intervention, and then access the generated configurations for subsequent applications. As a benefit, step 508 may generate configurations instructions by assembling one or more configuration instructions from a table, index, database or other repository. As a further example, step 506 may access a semantic description, such as "upgrade component Alpha to version 2" and step 508 then generate configuration instructions, by accessing one or more previously generated configuration instructions, for application by step 510. As a further example, logic may be inserted, such as when one contact center uses an associated, "component Beta" and another contact center uses an alternative associated, "component Gamma." The configuration instructions to, "upgrade component Alpha to version 2" may be different depending on which associated component is installed. In such a way, the combination of similar semantic descriptions may be associated with one or more configuration instructions. As a benefit, repeated semantic descriptions whether repeated on the same system (e.g., enable Joe's report/disable Joe's report) or on different systems (e.g., installation of a component) may be automated and may further reduce errors and/or increase efficiencies.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    accessing, by a processor, a first reporting object of a contact center, the first reporting object comprising a first number of reporting elements;
    reading, by the processor, the first number of reporting elements from the first reporting object;
    receiving, by the processor, a semantic identifier of a modification;
    mapping, by the processor, the semantic identifier to a modification of the first number of reporting elements; and
    generating, by the processor, a set of configuration instructions comprising the modification.

2. The method of claim 1, further comprising, applying the configuration instructions to a second reporting object having a second number of reporting elements.

3. The method of claim 2, further comprising:
    executing the second reporting object, thereby causing the second number of reporting objects to generate report data; and
    generating a report from the report data.

4. The method of claim 1, wherein the second reporting object comprises the first reporting object.

5. The method of claim 1, wherein the first reporting object is at least one of a data storage object and a data processing object.

6. The method of claim 1, wherein the first and second reporting objects are in-memory computing processes.

7. The method of claim 1, wherein the modification is at least one of a change to at least one of the first number of reporting elements, the addition of at a new reporting element to the first number of reporting elements, and the deletion of at least one of the first number of reporting elements.

8. The method of claim 1, wherein the first reporting object is a default reporting object absent any customization and the modification is a customization of the default reporting object.

9. A system, comprising:
a memory;
an input interface; and
a processor;
the processor being programmed to:
   access, in the memory, a first reporting object of a contact center, the first reporting object comprising a first number of reporting elements;
   read the first number of reporting elements from the first reporting object;
   receiving, via the input interface, a semantic identifier of a modification;
   mapping the semantic identifier to the modification of the first number of reporting elements; and
   generating a set of configuration instructions comprising the modification.

10. The system of claim 9, wherein the processor is further configured to apply the configuration instructions to a second reporting object in the memory having a second number of reporting elements.

11. The system of claim 10, wherein the processor is further configured to execute the second reporting object, thereby causing the second number of reporting objects to generate report data, and generate a report from the report data.

12. The system of claim 9, wherein the second reporting object comprises the first reporting object.

13. A non-transitory medium having instructions that when read by a computer cause the computer to perform:
   accessing a first reporting object of a contact center, the first reporting object comprising a first number of reporting elements;
   reading the first number of reporting elements from the first reporting object;
   receiving a semantic identifier of a modification;
   mapping the semantic identifier to a modification of the first number of reporting elements; and
   generating a set of configuration instructions comprising the modification.

14. The instructions of claim 13, further comprising, applying the configuration instructions to a second reporting object having a second number of reporting elements.

15. The instructions of claim 14, further comprising:
   executing the second reporting object, thereby causing the second number of reporting objects to generate report data; and
   generating a report from the report data.

16. The instructions of claim 13, wherein the second reporting object comprises the first reporting object.

17. The instructions of claim 13, wherein the first reporting object is at least one of a data storage object and a data processing object.

18. The instructions of claim 13, wherein the first and second reporting objects are in-memory computing processes.

19. The instructions of claim 13, wherein the modification is at least one of a change to at least one of the first number of reporting elements, the addition of at a new reporting element to the first number of reporting elements, and the deletion of at least one of the first number of reporting elements.

20. The instructions of claim 13, wherein the first reporting object is a default reporting object absent any customization and the modification is a customization of the default reporting object.

* * * * *